(12) United States Patent
Zhang et al.

(10) Patent No.: US 12,184,489 B1
(45) Date of Patent: Dec. 31, 2024

(54) COMMUNICATION DEVICE READY STATE ASSISTANCE

(71) Applicant: Hewlett-Packard Development Company, L.P., Spring, TX (US)

(72) Inventors: Peter Siyuan Zhang, Spring, TX (US); Srinath Balaraman, Spring, TX (US); Hsin Chin Lin, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/352,056

(22) Filed: Jul. 13, 2023

(51) Int. Cl.
*H04L 41/0816* (2022.01)

(52) U.S. Cl.
CPC ................. *H04L 41/0816* (2013.01)

(58) Field of Classification Search
None
See application file for complete search history.

(56) References Cited

U.S. PATENT DOCUMENTS

| | | | |
|---|---|---|---|
| 8,842,153 B2 | 9/2014 | Ranganath et al. | |
| 10,165,016 B2 | 12/2018 | Le Devehat et al. | |
| 10,560,662 B1 | 2/2020 | Tippana | |
| 11,128,675 B2 | 9/2021 | Blanchard et al. | |
| 11,582,275 B2 | 2/2023 | Bhamidipati et al. | |
| 2012/0086767 A1* | 4/2012 | Lau | H04N 7/148 348/14.02 |
| 2014/0187225 A1* | 7/2014 | Miller | H04W 4/12 455/418 |
| 2014/0219434 A1 | 8/2014 | Youel et al. | |
| 2018/0054691 A1* | 2/2018 | Sharifi | H04M 1/72427 |
| 2020/0036543 A1 | 1/2020 | Suhail et al. | |
| 2022/0191263 A1 | 6/2022 | Pichaimurthy et al. | |
| 2022/0246145 A1 | 8/2022 | Lum | |
| 2022/0350564 A1* | 11/2022 | Cao | G06F 3/1454 |

* cited by examiner

*Primary Examiner* — Fadi Haj Said
(74) *Attorney, Agent, or Firm* — Knobbe, Martens, Olson & Bear, LLP (57) ABSTRACT

An example non-transitory machine-readable storage medium includes instructions executable by a processing resource of an electronic device. The instructions cause the electronic device to receive a communication associated with a first mode of communication via the communication device and determine an intent to change from the first mode of communication to a second mode of communication. In response to determining the intent, the instructions cause the electronic device to determine that a communication device associated with the second mode of communication is not in a ready state and assist the communication device associated with the second mode of communication to be in the ready state.

17 Claims, 6 Drawing Sheets

COMMUNICATION DEVICE READY STATE ASSISTANCE

BACKGROUND

Participants often use various modes of communication for collaboration in work settings, such as chat messenger, video conference calls, phone calls, etc. Each mode of communication may require various combinations of communication devices to be used by a participant including microphones, speakers, headsets, keyboards, etc.

BRIEF DESCRIPTION OF THE DRAWINGS

Various features will now be described with reference to the following drawings. Throughout the drawings, reference numbers may be re-used to indicate correspondence between referenced elements. The drawings are provided to illustrate examples described herein and are not intended to limit the scope of the disclosure.

DETAILED DESCRIPTION

Participants to electronic modes of communication, such as video calls, audio calls, etc. typically utilize communicatively coupled devices in order to join and participate. For example, a participant to a video call may utilize wired or wireless headphones, a microphone, a camera, etc. among other communication devices (e.g., devices associated with different modes of communication). Additionally, it is common for participants to wish to quickly switch between mode of communications. For example, remote collaborators on a project may desire, mid-conversation, to switch from a text-based chat to a video call in order to screenshare or to discuss project details verbally. However, not all communication devices required for the new communication may be "ready." e.g., located proximate to the participant, have a sufficient battery level. It would be helpful for a communication device readiness system to be able to identify communication devices associated with an intended mode of communication and to assist in communication device readiness so that a participant may seamlessly and quickly transition between modes of communication.

Examples described herein provide an approach to assist in communication device readiness for a conference call, which may utilize any mode of electronic communication. As an example, an electronic device within the communication device readiness system may determine an intent to switch to a new mode of communication and further determine whether communication devices associated with the new mode of communication are "ready." If the system determines that the communication devices are not ready, the system may prompt certain actions to assist in readiness, such as flashing lights, sounds, notifications, etc. Once ready, the system may further prompt a change in the mode of communication.

Aspects of the present disclosure relate to an electronic device, comprising: a communication device; and a processor to: receive a communication associated with a first mode of communication via the communication device; determine an intent to change from the first mode of communication to a second mode of communication; in response to determining the intent, determine that a communication device associated with the second mode of communication is not in a ready state; and assist the communication device associated with the second mode of communication to be in the ready state.

Aspects of the present disclosure relate to an electronic device, comprising: a communication device; and a processor to: receive a communication associated with a first mode of communication via the communication device; determine an intent to change from the first mode of communication to a second mode of communication; determine that a device associated with the second mode of communication is in a ready state based on a proximity to a user, a volume level, a mute/unmute status associated with the second mode of communication, or a combination thereof; and automatically prompting a change to the second mode of communication.

Aspects of the present disclosure relate to a non-transitory computer readable medium having program instructions that when executed cause a hardware processor of an electronic device to: determine an intent to change from a first mode of communication to a second mode of communication; in response to determining the intent, determine that a communication device associated with the second mode of communication is not in a ready state based on a connection status, a signal strength, a battery power state of the communication device associated with the second mode of communication, or a combination thereof; and assist the communication device associated with the second mode of communication to be in the ready state.

Figure 1:
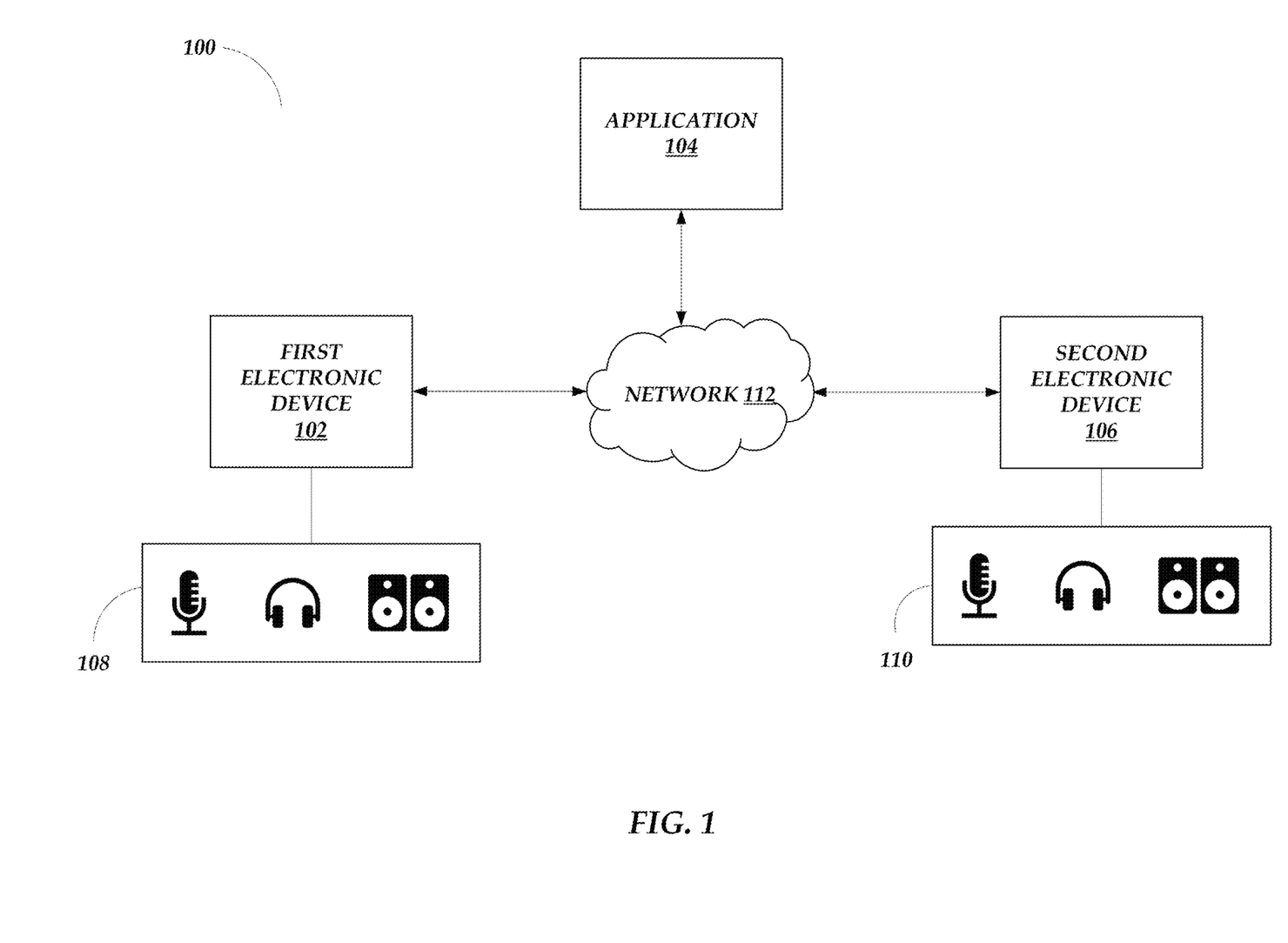
FIG. 1 illustrates an example communication device readiness system to manage and assist communication devices in preparation for communication.

FIG. 1 illustrates an example communication device readiness system 100 to determine intent to switch to a new mode of communication and assist communication devices to be in a "ready" state for the new mode of communication. Communication device readiness system 100 includes first electronic device 102, second electronic device 106, and communication devices 108, 110. First electronic device 102 may communicate with second electronic device 106 via an application 104 over a network 112. Although FIG. 1 illustrates a first electronic device 102 and a second electronic device 106, communication device readiness system 100 is not limited to two devices and may include a plurality of connected electronic devices.

In some examples, first electronic device 102 and second electronic device 106 may be any device capable of hosting, attending, and/or otherwise participating in a text message exchange, video conference or audio call according to any of a variety of modes of communications. For example, first electronic device 102 and second electronic device 106 may include personal computing devices, laptop computing devices, tablet computing devices, electronic reader devices, wearable computing devices, mobile devices (e.g., cellular phones, mobile phones, smart phones, media players, handheld gaming devices, etc.), streaming media devices, and various other electronic devices and appliances.

Communication device readiness system 100 may also include application 104. Application 104 may be any program, software, package, etc. configured to facilitate communication between first and second electronic devices 102, 106. For example, application 104 may include a chat-based messaging platform, a texting platform, an audio call platform, a video conference call platform, etc. In some examples, application 104 is web-based and may connect first and second electronic device 102, 106 over a network 112.

Network 112 may be a private network, a publicly-accessible network of linked networks, possibly operated by various distinct parties, such as the Internet, or a combination of the two. In some cases, the network 112 may be or include a private network, personal area network, local area network, wide area network, global area network, cable network, satellite network, cellular data network, etc., or a combination thereof, some or all of which may or may not have access to and/or from the Internet.

In an example, first electronic device 102 may receive a communication over the network from second electronic device 104 through application 104. In some examples, communications are in the form of text, audio, etc. For example, a user communication may be between a first user of first electronic device 102 and a second user of second electronic device 104. In this example, a first participant may send a message to a second participant: "Hey, I think chatting about the idea takes too long. You want to just have a quick call?" In some examples, communication device readiness system 100 may determine an intent to change the mode of communication. In the example message above, the communication device readiness system 100 may determine an intent to change from a chat-based mode of communication to an audio call mode of communication. In some examples, natural language processing models may be used in order to determine the intent of a communication. If no intent is determined, user communications may be continuously monitored until intent is determined. In some examples, determining the intent to change the mode of communication comprises receiving an intent over a network.

As shown in FIG. 1, each electronic device 102, 106 may be coupled to communication devices 108, 110, respectively. Communication devices 108, 110 may be any devices used according to one or more electronic modes of communication, such as text messaging, video conferencing or audio calls. For example, communication devices 108, 110 may include headphones, ear buds, headsets, microphones, speakers, cameras, text display screens, touch sensitive display screens, keyboards, video display screens, etc. As shown in FIG. 1, communication device 108 may be connected to the first electronic device 102 and communication device 110 may be connected to the second electronic device 106. For example, communication devices 108, 110 may be connected to each respective electronic device using a wired connection, wireless communication such as BLUETOOTH®, Wi-Fi®, according to an IEEE 802 (e.g., IEEE 802.11, IEEE 802.15.1) standard, etc. In some examples, communication devices 108, 110 may be integrated within the hardware of the electronic devices 102, 106, such as a laptop camera or laptop speaker.

In some examples, communication device readiness system 100 may determine whether communication devices are in a ready state for an intended mode of communication. In some examples, communication devices 108, 110 may or may not be in a ready state. Ready state, as used herein, may refer to a level of readiness of a communication device to a mode of communication. For example, a ready state may refer to a communication device being within a certain proximity to a user or the electronic device. For example, paired headphones to the electronic device may be considered in a ready state if the headset is located within a certain area surrounding the electronic device, or even registered as being worn by the user (such as being detected by sensors). In another example, a ready state may refer to a minimum volume level, an unmuted status, a connection status, a signal strength, a battery power state, etc. In some examples, each communication device may be associated with a different ready state.

In some examples, required communication devices to a mode of communication may vary depending on the mode of communication. In the example above, the intent to change to from a chat-based communication to an audio call may prompt the processor 202 to check whether a microphone and headphones are both in a ready state.

In some examples, if a communication device is determined to not be in a ready state, the communication device readiness system 100 may assist in communication device readiness. For example, a signal may be sent to communication devices 108, 110 from the electronic devices that further prompt a notification, alert, etc.

Figure 2:
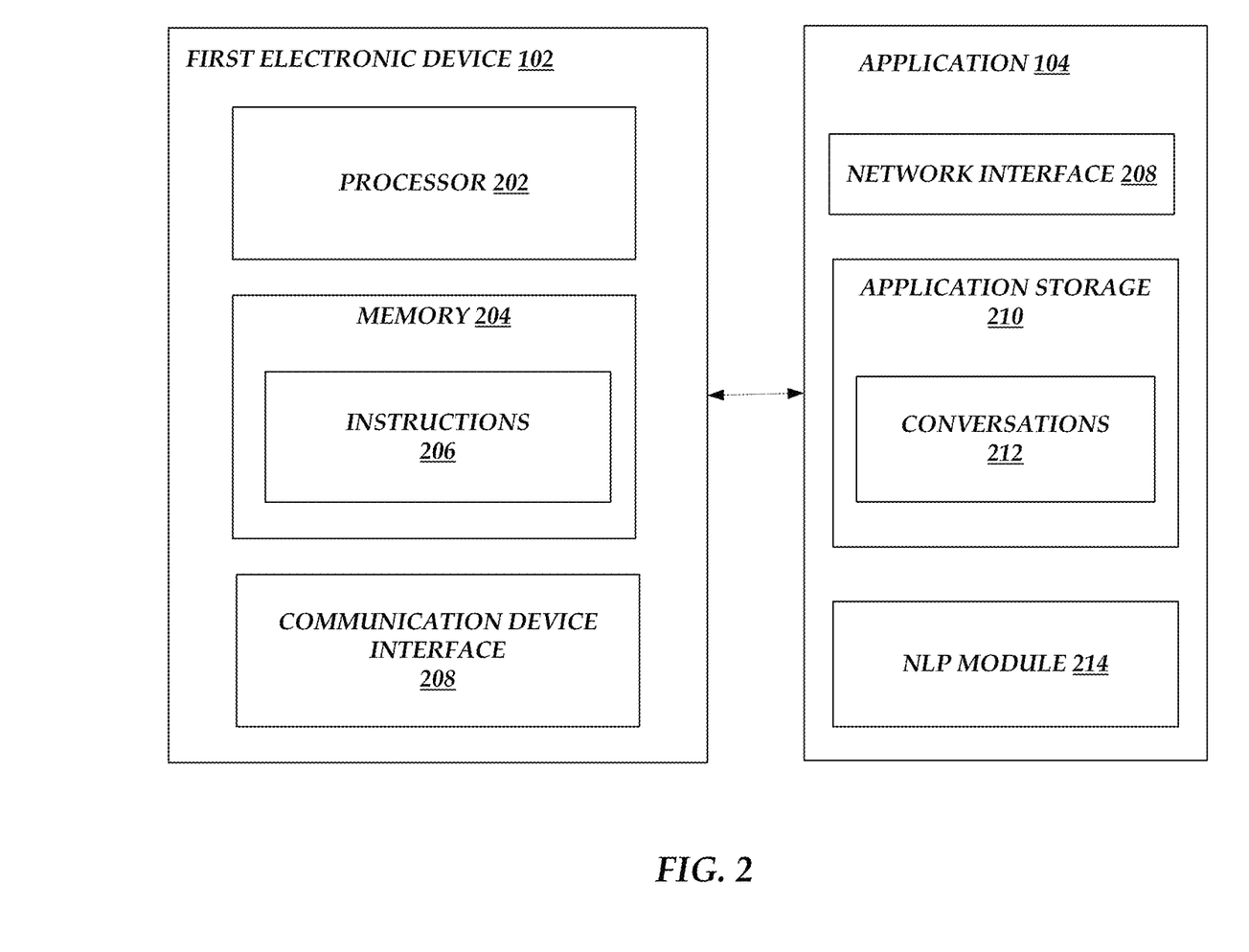
FIG. 2 illustrates an example electronic device within a communication device readiness system, such as the communication device readiness system of FIG. 1.

FIG. 2 illustrates an example first electronic device 102 and application 104 of the communication device readiness system 100 of FIG. 1. Although FIG. 2 illustrates components within first electronic device 102, any electronic device within communication device readiness system 100 may contain similar components. In an example, first electronic device 102 includes a processor 202, such as a physical central processing unit (CPU); memory 204, such as random access memory (RAM) and/or other volatile non-transitory computer-readable media; instructions 206 stored within memory 204; and communication device interface 208.

In some examples, instructions 206 may be implemented as software, computer-readable instructions, etc. to be executed by the processor 202. In some examples, instructions 206 may be executed by the processor 202 to perform various tasks within communication device readiness system 100, as further described below with respect to FIGS. 3-6. For example, instructions 206 may cause processor 202 to communicate with components of the first electronic device 102 in order to manage and assist preparing communication devices for communication by determining that a communication device is in a ready state before switching the mode of communication. In some examples, instructions 206 may cause the processor 202 to perform the following:

In some examples, processor 202 may determine an intent based on conversations or communications between the users of first and second electronic devices 102, 106 to change the mode of communication (e.g., from text to video, from video to audio only, from audio only to video, etc.). In some examples, processor 202 may utilize a natural language processing (NLP) module 214 to receive the intent to change the mode of communication, based on conversations 212.

In some examples, processor 202 may determine the communication devices required for an intended mode of communication. For example, the processor 202 may determine the required devices based on the intended mode of communication, e.g., a microphone may be needed for an audio call, a camera and video screen may be needed for a video call, a keyboard for a text session, etc.

For example, processor 202 may check whether each communication device is ready for the intended mode of communication. As noted above, a ready state may refer to a level of readiness of a communication device and may vary depending on the communication device.

In some examples, processor 202 determines that a communication device associated with an intended mode of communication is in a ready state. In some examples, determining that a device is in a ready state includes determining that a communication device is within a certain proximity to a user or the electronic device. In other examples, a communication device may be in a ready state if it is determined that the communication device is at a certain. In some examples, processor 202 assists with communication device readiness.

In some examples, processor 202 may be coupled to a communication device interface 208. In some examples, communication device interface 208 may be implemented as hardware, firmware, etc. that communicates with the communication devices (e.g., USB port, IEEE 802.15.1 communication standard (BLUETOOTH®) radio, IEEE 802.11 communication standard (WI-FI®), etc.). In some examples, processor 202 may determine that a communication device is not ready for an intended mode of communication. In that example, processor 202 may communicate a signal to the communication device interface 208. In some examples, communication device interface 208 may be configured to respond to such signal by assisting in device readiness. For example, the communication device interface 208 may respond by sending a signal to a communication device, such as an alert or other notification. In other examples, communication device interface 208 may assist in device readiness by changing a setting on the communication device, such as a mute/unmute status, a volume level, etc.

As illustrated in FIG. 2, first electronic device 102 may be communicatively coupled to application 104 (e.g., over a network, such as network 114, not shown). Application 104 may be any program, software, package, etc. configured to facilitate communication between first and second electronic devices 102 and 106. For example, application 104 may include a chat-based messaging platform, a texting platform, an audio call platform, a video conference call platform, etc. In some examples, application 104 is web-based and may connect first electronic device 102 to other electronic devices.

In some examples, application 104 includes communication device interface 208, such as a network interface card ("NIC"), application storage 210, and natural language processing (NLP) module 214.

In some examples, application storage 210 may be any memory or storage area used for storing data relating to application 104. In some examples, conversations 212 may be stored within application storage 210. Conversations 212 may include communications between participants of a first and second electronic device, respectively. For example, conversations 212 may include chat histories, chat logs, transcribed audio files, recordings, etc.

Application 104 may also include NLP module 214. In some examples, NLP module 214 may monitor or retrieve conversations 212 in order to determine an intent to change the mode of communication. Although NLP module 214 is shown as part of the application 104 in FIG. 2, NLP module 214 may be located elsewhere, such as within first electronic device 102, as part of both the application 104 and the first electronic device 102, or as a service accessible by the first electronic device 102 over the network. In some examples, NLP module 214 may process conversations 212 as they are being input by a participant to the first electronic device 102 to determine a communication mode intent.

Figure 3:
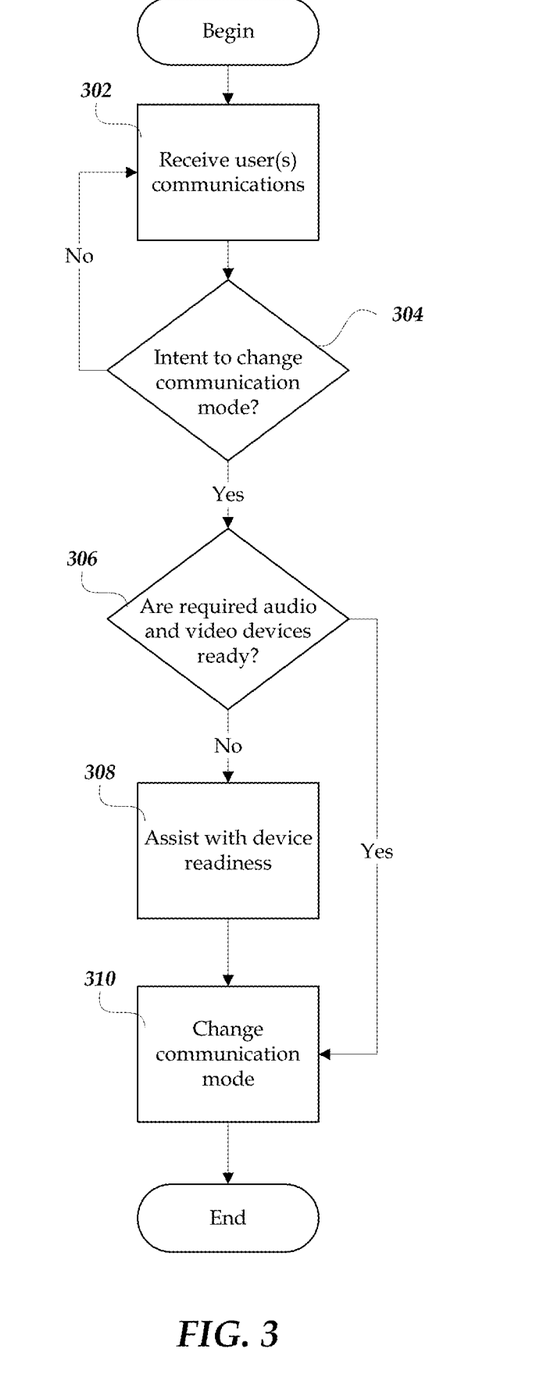
FIG. 3 is an example decision flow diagram of a process that may be performed by an electronic device, such as the electronic device of FIG. 2.

FIG. 3 is an example decision flow chart that may be performed by the processor 202 of communication device readiness system 100.

At block 302, the processor 202 may receive user communications. As noted above, communications may be in the form of text, audio, etc. and may be communicated between users via text messenger, phone call, video conference, etc.

At block 304, the processor 202 may determine the intent to change the mode of communication. In an example, as illustrated in FIG. 2, processor 202 may determine the intent by receiving an intent from the NLP module 214 of the application 104. In some examples, NLP module 214 may reference an NLP model, such as ChatGPT, or other artificial intelligence-based models. In some examples, processor 202 may determine the intent by receiving the intent over a network.

At block 306, if the processor 202 has determined an intent to change a mode of communication, the processor 202 may determine whether required communication devices are in a "ready state." As noted above, a ready state may refer to a level of readiness of a communication device to a mode of communication. For example, a ready state of a microphone may refer to an unmute status. In this example, the processor 202 may check whether the microphone is muted/unmuted. If the ready state is not met, the processor 202 may move to the next block 308. If the ready state is met, the processor 202 may skip block 306 and advance to block 310.

At block 308, the processor 202 may assist with communication device readiness. In some examples, depending on the communication device, the processor 202 may prompt different actions to assist in communication device readiness. For example, prompted actions may include sending a notification or alert, which may be displayed on a screen of the electronic device. A notification or alert may assist in locating a communication device, or indicating to a user that a communication device is at an insufficient power level or at a weak connection signal. In another example, the processor 202 may assist by prompting an action on a communication device, such as by raising a volume level, emitting a noise or sound, changing a mute/unmute status, or even flashing a light. In some examples, the processor 202 may continue to monitor the status of the communication device in order to determine whether the communication device is in a ready state.

At block 310, the processor 202 may prompt a change in the mode of communication, given all the required communication devices are in the ready state. In an example, a meeting notification that a meeting is about to start may be automatically displayed on a screen of the electronic device. In this example, a user may confirm that the required communication devices are ready and may subsequently join a conference call in the new mode of communication.

Figure 4:
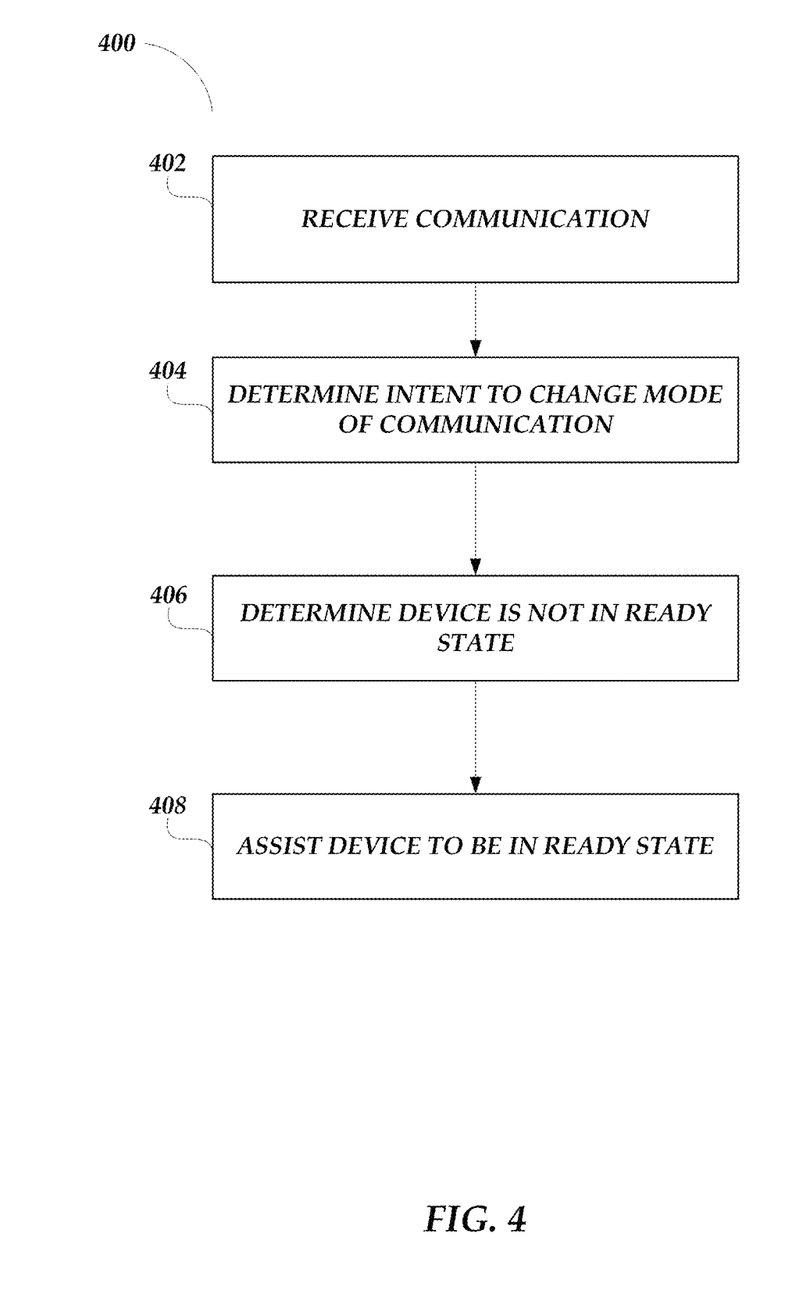
FIG. 4 is an example flow diagram depicting a process for managing and assisting in communication device readiness for a conference call, and which may be performed by an electronic device such as the electronic device of FIG. 2.

FIG. 4 a flow diagram depicting an example routine 400 for managing and assisting in communication device readiness for a conference call. Routine 400 may be implemented by a processor of an electronic device, such as electronic devices 102 or 106.

At block 402, the processor of the electronic device receives a communication. In some examples, the communication is associated with a first mode of communication via the communication device. In some examples, the first mode of communication is text messaging.

At block 404, the processor of the electronic device determines an intent to change the mode of communication. In some examples, the processor may determine the intent to change from the first mode of communication to a second mode of communication. In some examples, the second mode of communication is an audio call or a video call. In some examples, determining the intent to change from the first mode of communication to the second mode of communication comprises utilizing natural language processing. In some examples, determining the intent to change the mode of communication comprises receiving the intent over a network.

At block 406, the processor of the electronic device, in response to determining the intent, determines that a communication device is not in a ready state. In some examples, the communication device is associated with the second mode of communication. In some examples, the communication device associated with the second mode of communication includes a headset, a microphone, a speaker, or a video camera. In some examples, determining that the communication device associated with the second mode of communication is not in the ready state includes determining a proximity to a user, a volume level, a mute/unmute status, a connection status, a signal strength, or a battery power state of the communication device associated with the second mode of communication.

At block 410, the processor of the electronic device assists the device associated with the second mode of communication to be in the ready state. In some examples, assisting the communication device associated with the second mode of communication includes sending a notification, sending an alert, or prompting an action on the communication device associated with the second mode of communication. In some examples, prompting the action on the communication device associated with the second mode of communication includes raising a volume level, changing a mute/unmute status, or flashing a light.

In some examples, the processor is further to determine that the communication device is in the ready state. In some examples, the processor is further to prompt a change to the second mode of communication.

Figure 5:
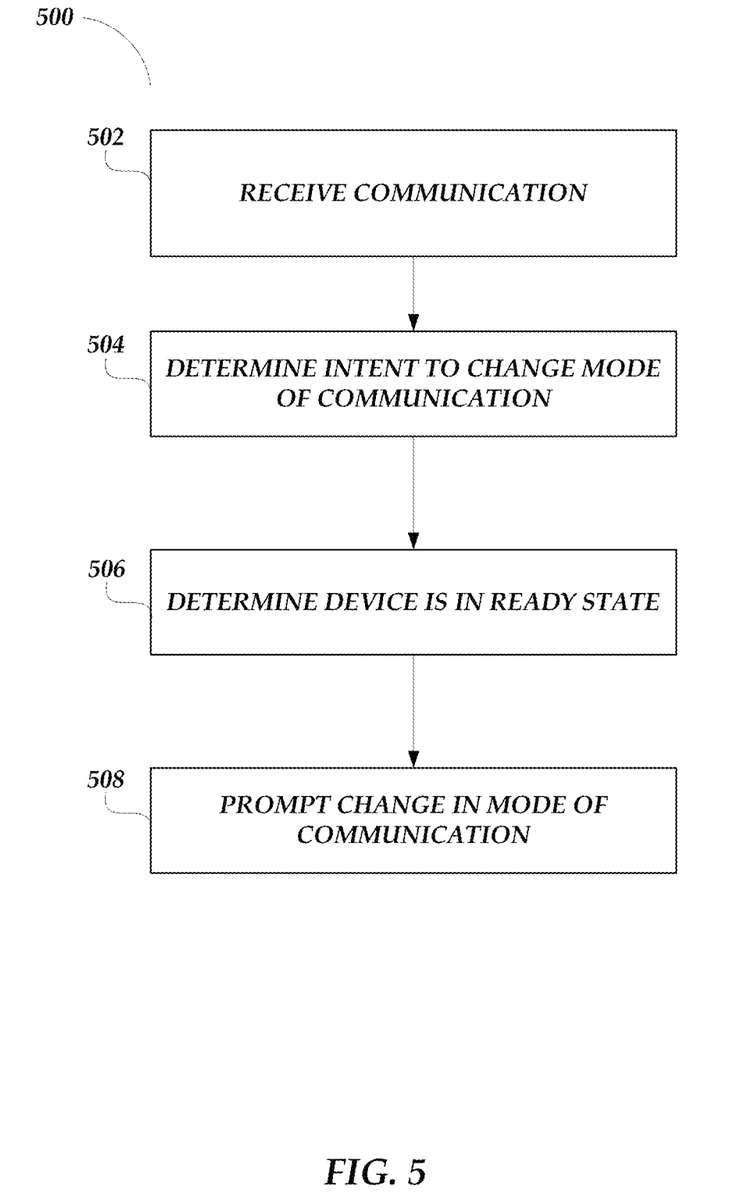
FIG. 5 is an example flow diagram depicting a process for determining communication device readiness for a call, and which may be performed by an electronic device, such as the electronic device of FIG. 2.

FIG. 5 is a flow diagram depicting an additional example routine for determining communication device readiness for a call. Routine 500 may be implemented by a processor of an electronic device, such as electronic devices 102 or 106.

At block 502, the processor of the electronic device receives a communication. In some examples, the communication is associated with a first mode of communication via the communication device. In some examples, the first mode of communication is text messaging.

At block 504, the processor of the electronic device determines an intent to change a mode of communication. In some examples, the processor may determine the intent to change from the first mode of communication to a second mode of communication. In some examples, the second mode of communication is an audio call or a video call. In some examples, determining the intent to change from the first mode of communication to the second mode of communication comprises utilizing a natural language processor. In some examples, determining the intent to change the mode of communication comprises receiving the intent over a network.

At block 506, the processor of the electronic device determines that a communication device associated with the second mode of communication is in a ready state. In some examples, the communication device associated with the second mode of communication includes a headset, a microphone, a speaker, or a video camera. In some examples, the electronic device determines the communication device is in the ready state based on a proximity to a user, a volume level, a mute/unmute status associated with the second mode of communication, or a combination thereof.

At block 508, the processor of the electronic device automatically prompts a change to the second mode of communication.

Figure 6:
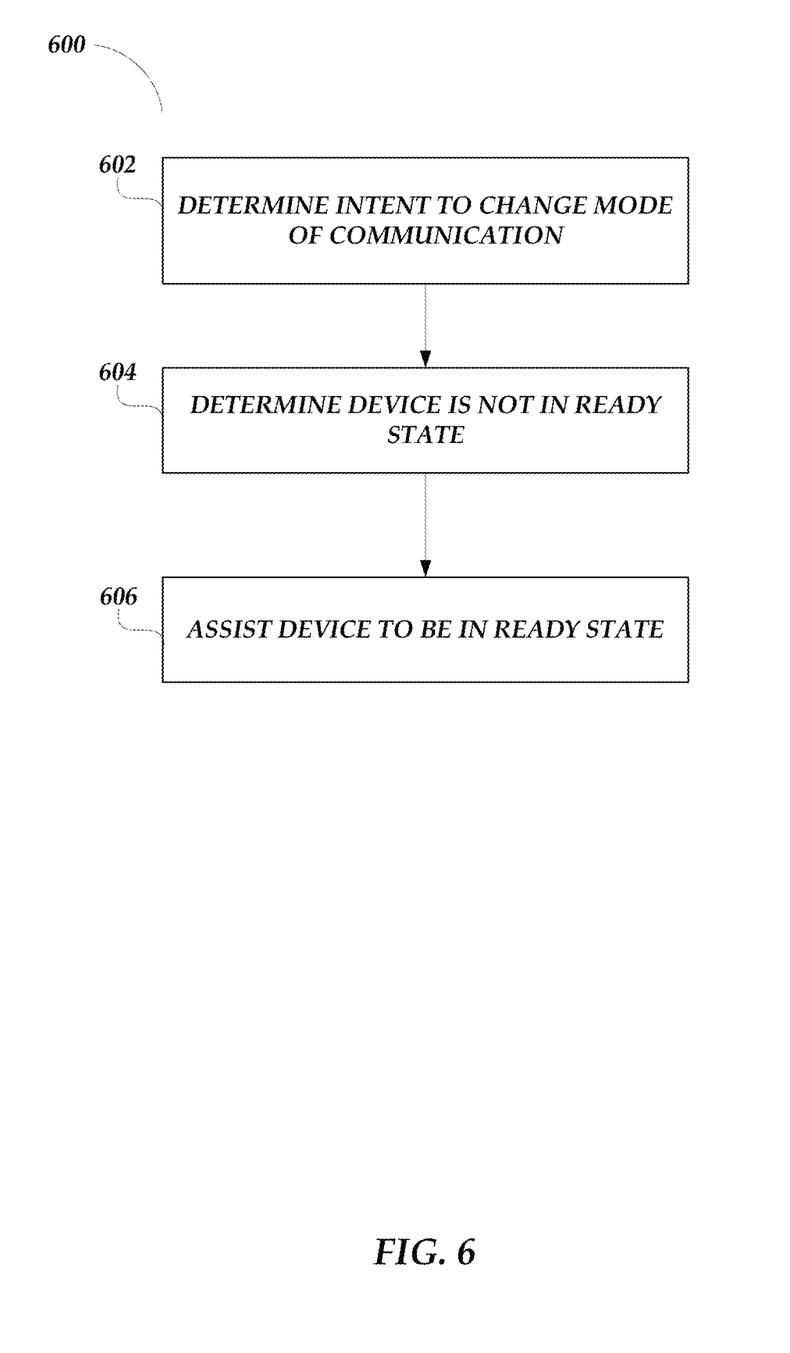
FIG. 6 is an example flow diagram depicting a process for determining and assisting in communication device readiness for a call, and which may be performed by an electronic device, such as the electronic device of FIG. 2.

FIG. 6 is a flow diagram depicting an example routine for determining and assisting in communication device readiness for a call. Routine 600 may be implemented by a processor of an electronic device, such as electronic devices 102, 106.

At block 602, the processor of the electronic device determines an intent to change from the first mode of communication to a second mode of communication. In some examples, the first mode of communication is text messaging, and the second mode of communication is an audio call or a video call. In some examples, determining the intent to change from the first mode of communication to the second mode of communication comprises utilizing a natural language processor. In some examples, determining the intent to change the mode of communication comprises receiving the intent over a network.

At block 604, the processor of the electronic device, in response to determining the intent, determines that a communication device associated with the second mode of communication is not in a ready state. In some examples, the communication device associated with the second mode of communication includes a headset, a microphone, a speaker, or a video camera. In some examples, the processor determines that the communication device is not in the ready state based on a connection status, a signal strength, a battery power state of the communication device associated with the second mode of communication, or a combination thereof.

At block 606, the processor of the electronic device assists the communication device associated with the second mode of communication to be in the ready state. In some examples, assisting the communication device associated with the second mode of communication includes sending a notification, sending an alert, raising a volume level, changing a mute/unmute status, or flashing a light.

In some examples, the processor further determines that the communication device is in the ready state. In some examples, the processor further prompts a change to the second mode of communication.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of electronic devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable electronic device, a device controller, or a computational engine within an appliance, to name a few.

Conditional language such as, among others, "can," "could." "might." or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z." unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures. should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. An electronic device, comprising:
  a first communication device, wherein the first communication device is a first accessory paired with the electronic device;
  a second communication device, wherein the second communication device is a second accessory paired with the electronic device; and
  a processor to:
    receive a communication associated with a first mode of communication via the first communication device;
    send the communication to a natural language processor to determine whether to change from the first mode of communication to a second mode of communication;
    in response to determining whether to change from the first mode of communication to the second mode of communication, identify a second communication device associated with the second mode of communication;
    determine that the second communication device associated with the second mode of communication is not in a ready state; and
    assist the second communication device associated with the second mode of communication to be in the ready state.

2. The electronic device of claim 1, wherein the processor is to:
  determine that the second communication device is in the ready state; and
  prompt a change to the second mode of communication.

3. The electronic device of claim 1, wherein the first mode of communication is text messaging.

4. The electronic device of claim 1, wherein the second mode of communication is an audio call or a video call.

5. The electronic device of claim 1, wherein determining whether to change from the first mode of communication to the second mode of communication comprises receiving the determination over a network.

6. The electronic device of claim 1, wherein the second communication device associated with the second mode of communication includes a headset, a microphone, a speaker, a keyboard, or a video camera.

7. The electronic device of claim 1, wherein determining that the second communication device associated with the second mode of communication is not in the ready state includes determining a proximity to a user, a volume level, a mute/unmute status, a connection status, a signal strength, or a battery power state of the second communication device associated with the second mode of communication.

8. The electronic device of claim 1, wherein assisting the second communication device associated with the second mode of communication includes sending a notification, sending an alert, or prompting an action on the second communication device associated with the second mode of communication.

9. The electronic device of claim 8, wherein prompting the action on the second communication device associated with the second mode of communication includes raising a volume level, changing a mute/unmute status, or flashing a light.

10. An electronic device, comprising:
a processor to:
receive a communication associated with a first mode of communication;
determine whether to change from the first mode of communication to a second mode of communication using a natural language processor;
identify a device associated with the second mode of communication, wherein the device is an accessory paired with the electronic device;
determine that the device associated with the second mode of communication is in a ready state based on a proximity to a user, a volume level, a mute/unmute status associated with the second mode of communication, or a combination thereof; and
automatically prompting a change to the second mode of communication.

11. The electronic device of claim 10, wherein the first mode of communication is text messaging, and wherein the second mode of communication is an audio call or a video call.

12. The electronic device of claim 10, wherein determining whether to change from the first mode of communication to the second mode of communication comprises receiving the determination over a network.

13. A non-transitory computer readable medium having program instructions that when executed cause a hardware processor of an electronic device to:
determine whether to change from a first mode of communication to a second mode of communication using a natural language processor;
in response to determining whether to change from the first mode of communication to the second mode of communication, identify a communication device associated with the second mode of communication, wherein the communication device is an accessory paired with the electronic device;
determine that the communication device associated with the second mode of communication is not in a ready state based on a connection status, a signal strength, a battery power state of the communication device associated with the second mode of communication, or a combination thereof; and
assist the communication device associated with the second mode of communication to be in the ready state.

14. The non-transitory computer readable medium of claim 13, wherein the hardware processor is to:
determine that the communication device is in the ready state; and
prompt a change to the second mode of communication.

15. The non-transitory computer readable medium of claim 13,
wherein determining whether to change from the first mode of communication to the second mode of communication comprises receiving the determination over a network.

16. The non-transitory computer readable medium of claim 13, wherein the communication device associated with the second mode of communication includes a headset, a microphone, a speaker, a keyboard, or a video camera.

17. The non-transitory computer readable medium of claim 13, wherein assisting the communication device associated with the second mode of communication includes sending a notification, sending an alert, raising a volume level, changing a mute/unmute status, or flashing a light.

* * * * *